United States Patent [19]
Stöck

[11] Patent Number: 5,271,696
[45] Date of Patent: Dec. 21, 1993

[54] TOOL BIT FOR MACHINING MATERIALS

[75] Inventor: Maximilian Stöck, Azmoos, Switzerland

[73] Assignee: Hilti Aktiengesellschaft, Furstentum, Liechtenstein

[21] Appl. No.: 866,883

[22] Filed: Apr. 3, 1992

[30] Foreign Application Priority Data

Apr. 8, 1991 [DE] Fed. Rep. of Germany ....... 4111238

[51] Int. Cl.$^5$ ............................................. B23B 27/14
[52] U.S. Cl. ................................... 408/144; 407/119; 408/145
[58] Field of Search ............... 76/101.1, 108.1, 108.6, 76/DIG. 11, DIG. 12; 408/144, 145; 407/118, 119; 51/295, 297, 309

[56] References Cited

U.S. PATENT DOCUMENTS

| | | | |
|---|---|---|---|
| 4,776,862 | 10/1988 | Wiand | 51/295 |
| 5,049,164 | 9/1991 | Horton et al. | 51/309 |
| 5,126,207 | 6/1992 | Chen et al. | 51/295 |

FOREIGN PATENT DOCUMENTS

| | | | |
|---|---|---|---|
| 162656 | 11/1985 | European Pat. Off. | 408/145 |
| 170262 | 9/1984 | Japan | 408/144 |
| 90884 | 5/1985 | Japan | 408/144 |
| 60901 | 3/1991 | Japan | 408/145 |
| 226575 | 10/1991 | Japan | 408/145 |
| 19001 | 1/1992 | Japan | 408/145 |

*Primary Examiner*—Daniel W. Howell
*Attorney, Agent, or Firm*—Anderson Kill Olick & Oshinsk

[57] ABSTRACT

A tool bit for machining a hard material includes a carrier member (1) supporting polycrystalline diamond platelets (2) with the platelets including a hard metal base member (2a) and a diamond-type layer (2b) supported by the base body. At least the diamond-type layer (2b) is covered by a hard metal layer (3). The hard metal layer (3) serves a carbon diffusion block, whereby the tool bit can be used for machining ferroalloys. Without such a hard metal layer (3) chemical wear occurs due to carbon interaction.

12 Claims, 2 Drawing Sheets

TOOL BIT FOR MACHINING MATERIALS

BACKGROUND OF THE INVENTION

The present invention is directed to a tool bit including a carrier member with a diamond-type or adamantine layer.

It is known in tools used for machining materials of various types, such as timber, rock, metal alloys and the like, to provide a carrier member with hard metal members. In machining operations using tool bit, the tool bits can be used for milling, boring, turning, or cutting with the carrier members having a correspondingly adapted shape. The hard metal or cutting metal members depending on the particular operation being performed, can be connected with the end faces of carrier member, such as by soldered connections.

It is known from patent publication EP-A 0 306 077 for increasing resistance to wear, to cover the hard metal member with one or several layers of metallic boron nitride with the boron concentration kept below a specific value. These layers act as a sort of diffusion block. In such members it is essential that the hardness of the applied layer is greater than that of the subjacent hard metal layer, whereby the cover layer has to be self-supporting. To afford this self-supporting property, the cover layer must have a relatively great thickness in the range of 1 to 10 micrometers. Such a great thickness involves internal or residual stress, whereby the layer is fracture and crackprone, especially to yielding of the softer subjacent layer or support base.

When machining or working on timber, aluminum alloys, rock and the like the use of tool bits with a diamond-type or adamantine layer have been used for affording a high resistance to wear. In such tools a carrier member is employed corresponding to the type of machining operation to be carried out.

The diamond-type or adamantine layer can be in different forms. The layer can be applied to the carrier member by known polyvinyldichloride or chemical vapor deposition methods. Further, there is the possibility of arranging individual diamond grains, for instance by soldering or a galvanic method, formed on the carrier member. Polycrystalline diamond platelets have a hard metal base member with the diamond grains bonded to it or as a diamond layer.

While diamond-type layers are especially advantageous in the above-mentioned applications involving resistance to wear, there is the disadvantage that they cannot machine iron compositions or ferroalloys. When ferroalloys are being machined, an interaction occurs between the diamond-type layers containing carbon and the iron in such a way that chemical wear of the layer occurs. Such an interaction can occur if concrete with steel reinforcing has to be cut or drilled and such a tool bit with a diamond-type layer encounters the steel reinforcing. Since it is common to encounter steel reinforcement in most concrete structures, tool bits with diamond-type layers cannot be used.

SUMMARY OF THE INVENTION

Therefore, the primary object of the present invention is to provide a tool bit containing a diamond-type layer which is suitable for working on ferroalloys or materials containing ferroalloys.

In accordance with the present invention, at least one diamond-type or adamantine layer is covered with a thin hard metal layer acting as a carbon diffusion barrier.

If the tool bit including a diamond-type layer as described above is used for machining ferroalloys, the hard metal layer forms a diffusion barrier. Due to the diffusion barrier, there is no interaction between the diamond-type layer and the ferroalloy, so that no disadvantageous chemical layer occurs. Since the diamond-type layer with its very high hardness serves as a underlayer for the hard metal layer, the hard metal layer does not need to be self-supporting, whereby it can have a very small thickness, for instance in the range of 0.1 to 1 micrometer. Due to this very thin hard metal layer, only slight internal stresses arise, so that crack formation as might occur in a thicker layer is avoided. Because of the non-existence of interaction between the diamond-type layer and the ferroalloy, the friction coefficient is reduced and promotes the "flowing" of the "chips". In practice it is sufficient if only the diamond-type layer of the tool bit is covered with the hard metal layer. Depending on the method used for applying the hard metal layer, other portions of the tool bit, for instance if polycrystalline diamond platelets are used, may also cover a portion of the hard metal base member. Polycrystalline diamond platelets covered entirely or only partially with the hard metal layer are preferably connected to the carrier member by soldering, so that recesses in the carrier member can be adapted to receive the platelets.

In forming the diffusion block, the hard metal layer may be preferably formed of metal nitrides. In particular, titanium nitrides are advantageous as metal nitrides.

In another embodiment, the diffusion block is formed with metal oxides, and aluminum oxides are especially advantageous because of economic considerations.

In still another embodiment the hard metal layer may contain metal carbides for increasing the hardness. For achieving the requisite high hardness, titanium carbides have an advantageous effect. The over-stoichiometric carbon content of the hard metal layer resulting from the above embodiments has, in addition, a lubricating effect, whereby the friction coefficient between the tool bit and the material being machined is reduced.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
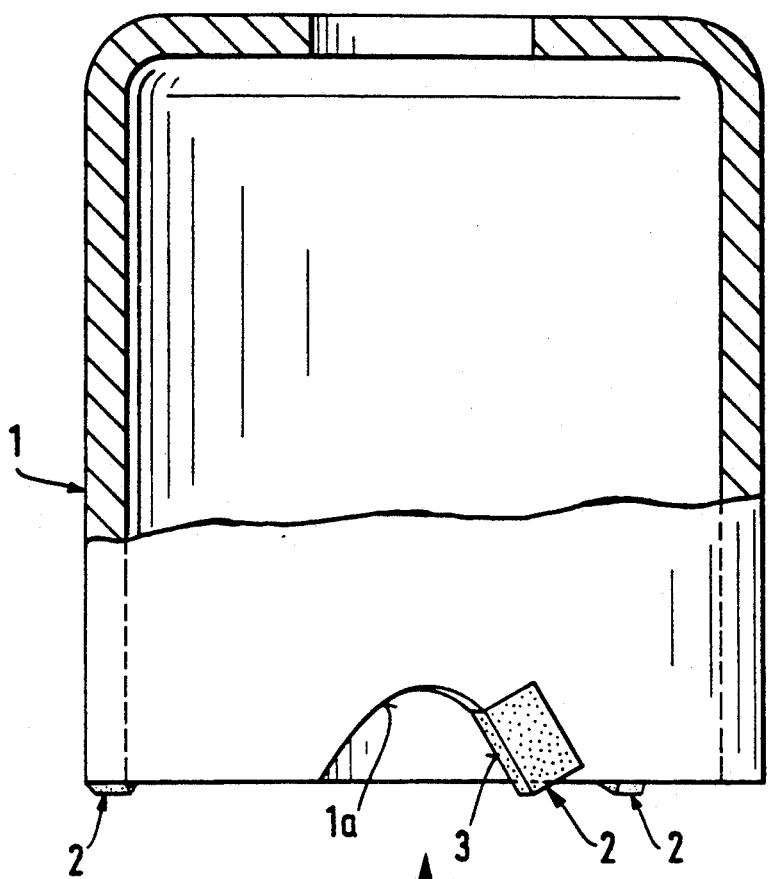
FIG. 1 is an elevational view, partly in section, in the form of a hole cutter with polycrystalline diamond platelets.
Figure 2:
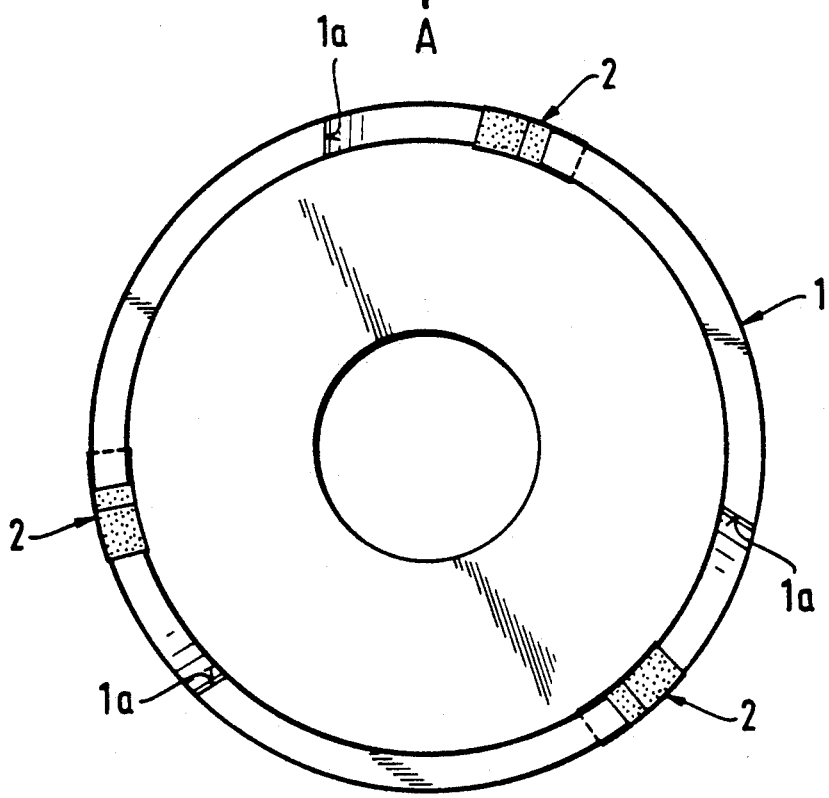
FIG. 2 is a front or leading end view of the tool bit in FIG. 1 viewed in, the direction of the arrow A.

In FIGS. 1 and 2 a tool bit in the form of a crown drill or recess cutter is shown. The tool bit is formed of a hollow carrier member 1 with recesses 1a in its leading end, that is the lower end in FIG. 1, with polycrystalline diamond platelets 2 positioned within the recesses 1a and facing in the rotational direction. As viewed in FIG. 2, there are three recesses 1a each with a polycrystalline diamond platelet 2 with the platelets spaced equiangularly apart around the outer circumference of the carrier member 1.

Figure 3:
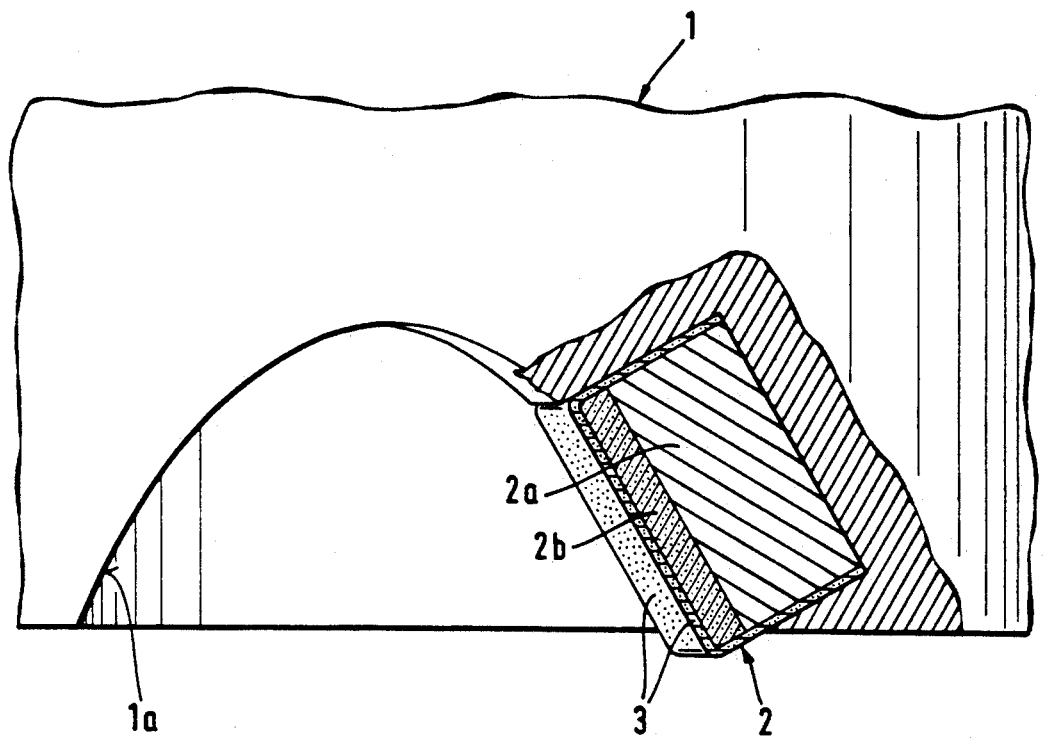
FIG. 3 is an enlarged elevational view of a part of the tool bit in FIG. 1 with a portion of a carrier member and the diamond platelet shown in sections.

FIG. 3 is an enlarged view showing a part of the carrier member 1 and one of the recesses 1a in its leading end. Furthermore, FIG. 3 shows a polycrystalline diamond platelet 2 made up of a hard metal base body 2a and a diamond-type layer 2b. The platelet faces in the rotational direction. The diamond-type layer 2b and a portion of the hard metal basic body 2a are covered by a hard metal layer 3.

The arrangement of the hard metal layer 3 in FIG. 3 is intended only as an example. Actually it is sufficient if only the diamond-type layer 2b is covered by the hard layer 3. Depending on the fabrication process, the entire polycrystalline diamond platelet 2 can be covered by the hard metal layer 3. While the thickness of the diamond-type layer 2b is approximately 0.7 mm, the thickness of the small metal layer is in the range of 0.1 to 1 micrometer.

While specific embodiments of the invention have been shown and described in detail to illustrate the application of the inventive principles, it will be understood that the invention may be embodied otherwise without departing from such principles.

I claim:

1. Cutting element for a tool bit, such cutting element having a surface arranged to face and contact a material to be worked and comprising a hard metal base body having a surface facing the material to be worked, a diamond-type layer covering at least a portion of the surface of the hard metal base body facing the surface to be worked, and a metal nitride material layer disposed directly on the diamond-type layer and forming the surface of the tool bit arranged to contact the material to be worked and acting as a carbon diffusion barrier.

2. Cutting element, as set forth in claim 1, wherein said metal nitride material layer is a titanium nitride layer.

3. Cutting element, as set forth in claim 1, wherein said metal nitride material layer has a thickness in the range of 0.1 to 1 micron.

4. Cutting element, as set forth in claim 2, wherein said titanium nitride layer has a thickness in the range of 0.1 to 1 micron.

5. Tool bit comprising a cutting member having a surface arranged to face a material to be cut, at least one polycrystalline diamond platelet secured to the surface of the cutting member arranged to face the material to be cut, said platelet comprising a hard metal base body having a surface facing the material to be cut, a diamond-type layer covering at least the surface of said base body facing the material to be cut, and a thin hard metal layer disposed directly on the diamond-type layer and forming the surface of said cutting member for contacting the material to be cut.

6. Tool bit, as set forth in claim 5, wherein said thin hard metal layer comprises a metal nitride.

7. Tool bit, as set forth in claim 6, wherein said metal nitride is a titanium nitride.

8. Tool bit, as set forth in claim 7, wherein said thin hard metal layer has a thickness in the range of 0.1 to 1 micron.

9. Tool bit, as set forth in claim 5, wherein said hard metal layer comprise a metal oxide.

10. Tool bit, as set forth in claim 9, wherein the metal oxide is an aluminum oxide.

11. Tool bit, as set forth in claim 5, wherein said hard metal layer comprises a metal carbide.

12. Tool bit, as set forth in claim 11, wherein said metal carbide is a titanium carbide.

* * * * *